United States Patent Office 3,506,819
Patented Apr. 14, 1970

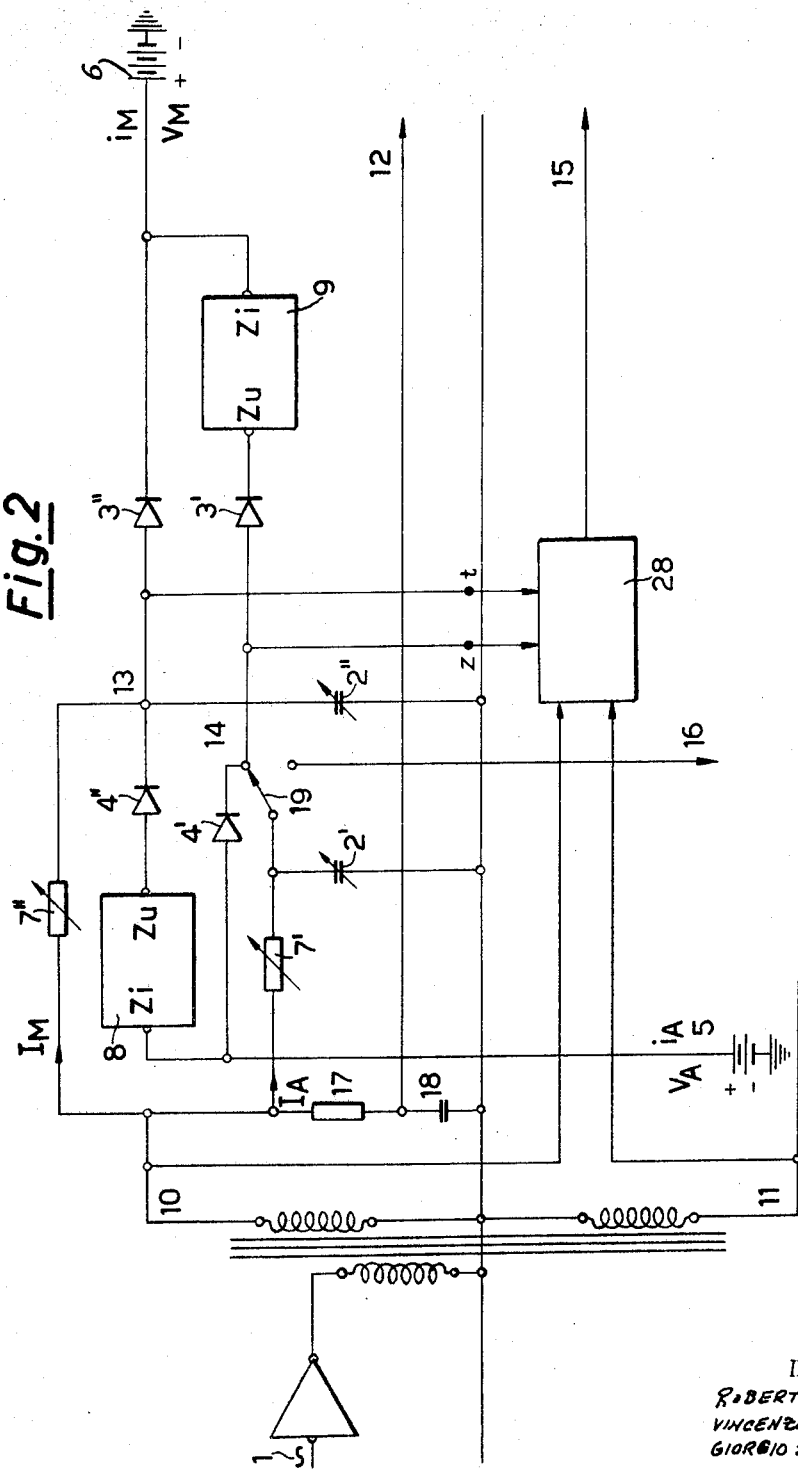

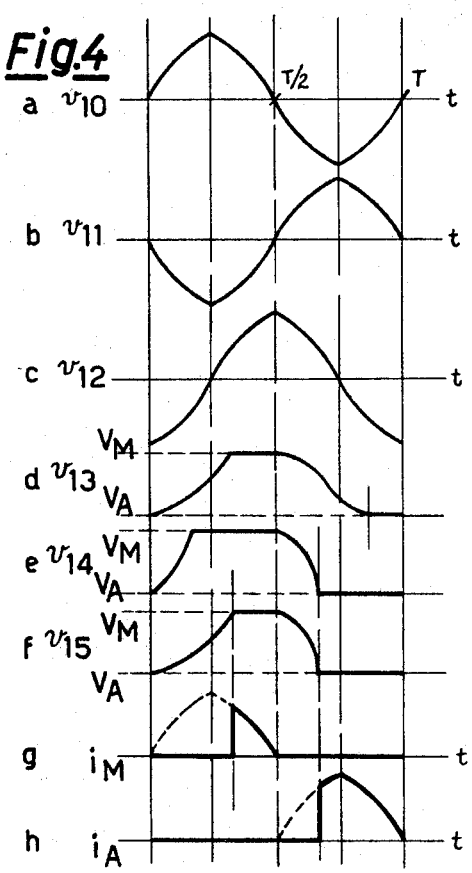
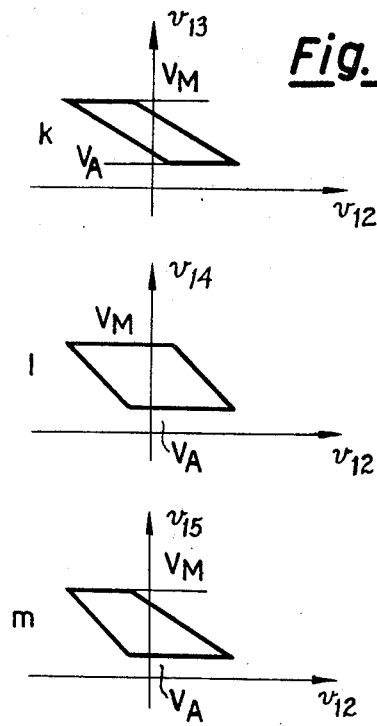

3,506,819
ELECTRONIC SIMULATOR FOR CYLINDERS OF RECIPROCATING COMPRESSORS
Roberto Carli, Milan, Vincenzo Gervasio, San Donato Milanese, and Giorgio Spallanzani, Milan, Italy, assignors to SNAM S.p.A., Milan, Italy, an Italian company
Filed Oct. 18, 1965, Ser. No. 497,004
Claims priority, application Italy, May 14, 1965, 4,662/65
Int. Cl. G06g 7/70
U.S. Cl. 235—184    3 Claims

ABSTRACT OF THE DISCLOSURE

The invention comprises an electronic simulator for the operation of an engine having reciprocating pistons, employing voltages to simulate fluid pressures and currents to simulate fluid flow, and consisting of two similar, coupled circuits provided with a common higher and a common lower potential source, the potentials of the two sources simulating, respectively, the discharge and intake pressures of a cylinder, each circuit including two rectifiers, to simulate valves, connected in series to limit current flow from the lower to the higher potential source, a variable capacitor simulating cylinder volume, and an alternating current source connected, in series with a variable resistor, across the capacitor to simulate the movement of the piston in the cylinder.

---

This invention relates to an electronic simulator device for compression cylinders, capable of simulating the characteristics of any possible operative cycles.

In gas-compression installations equipped with reciprocating compressors, pressure oscillations superimposed on the mean value are generally experienced unless special expedients are adopted.

These oscillations are due to the discontinuous form in which pressure is supplied to the gas. The amplitude of said oscillations can be notably enhanced in those particular cases in which the geometrical dimensions of the installation, the properties and the physical conditions of the fluid become conducive to resonance phenomena for the frequencies which are present in the discontinuous excitation as supplied by the compressors.

Resonance phenomena, as a whole, give rise to certain shortcomings, the principal ones of which are:

(1) Mechanical stresses of pulsatory character on all the components of the installation such as flanges, elbow joints, welded connections and the like, (2) Increase of the noise level, (3) Irregular operation of the intake and delivery valves of the cylinders, (4) Deformation of the compressors' working cycles, (5) Irregular operation of the instruments connected in the installation.

In order that the above indicated shortcomings may be corrected, a designer should be in a position to forecast in the most accurate possible way the behaviour of the installation with respect to the pressure oscillations.

In view of the intricacy which is generally involved in such a study, only the adoption of a model of the system could lead to acceptable results in an economically satisfactory way.

Of all the possible models, the most reliable one is that based on the analogy between mechanical and electrical magnitudes, the correspondences which are generally adopted being as follows:

Pressures=Voltages
Mass rate of flow=Currents due to the ease of measurement and recording through the electrical system, of the instantaneous pressures for all points of the system for the rates of flow, even when sections of the compressor installation at different temperatures are considered. The rates of flow do not vary with variation of pressure and temperature. Consequently, the currents of the analogous model, which have to simulate these mass rates of flow, must not vary with variation of the pressure and of the temperature.

The analogy as described above suggests a representation of the passive elements of the system (ducts, cooling appliances, pulsation dampers, and the like) by means of circuitry components (inductances, capacitors and resistors) according to formulate which are well known in the relevant art.

For the simulation of the active elements (compression cylinders) equivalent electric circuitries are used which, on the basis of the correspondences aforementioned, should supply current pulses which are proportional to the intake and delivery rates of flow of the compressor so as to exemplify the working cycle thereof.

A few of these equivalent circuitries are known, such as the one disclosed in the U.S. Patent No. 2,951,638, which, however, confines its adoption to the single case of working cycles having intake and delivery strokes of less than 90°, in that, for intake or delivery pulses of more than 90°, the waveform is deviated from the sinusoidal shape somewhat, thus introducing current ripples which have no counterpart in the factual situation.

The principal object of the present invention is thus to do away with said drawback by providing a circuitry which not only is adapted to simulate any working cycle of a compressor, also by utilizing different scales for simulating the intake and delivery rates of flow, but is also adapted correctly to simulate the utilization of the dead spaces of the compressor as a pulsation dampening chamber, the rate of flow adjustments and also the mechanical coupling of more cylinders mounted on the same crankshaft.

The invention is illustrated in and by the accompanying drawings which are given by way of example only and without any limitations, in that the adoption of constructional methods other those adopted here, or of equivalent component parts, lies within the scope of this invention.

FIG. 2 is illustrative of the general assembling diagram of the compression cylinders' simulator.

FIG. 4 shows voltage and current waveforms relevant to different points of the circuit of FIG. 2.

FIG. 6 shows working cycles relevant to the circuitry of FIG. 2.

Figure 1:
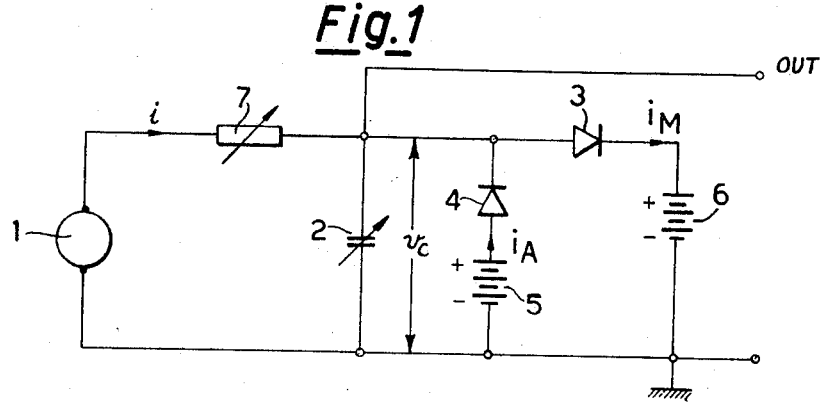
FIG. 1 is illustrative of a principle diagram of the compression cylinders' simulator.

The simulator circuitry comprises a sine-wave voltage generator 1, a variable capacitor 2 simulating the equivalent volume of the compression cylinder, diodes 3 and 4 simulating the intake and delivery valves, and two positive DC voltage generators 5 and 6 simulating the mean working pressures of said compressor.

It is understood that the voltage supplied by the generator 5 is lower than the one supplied by the generator 6. More specifically, the generator 5 provides a continuous and positive voltage $V_A$ which, in the analogy adopted, simulates the intage pressure $P_A$ of the compressor while the generator 6 provides a continuous and positive voltage $V_M$ which simulates its delivery pressure $P_M$. From what has been stated it clearly follows that the voltage $V_M$ has to be greater than the voltage $V_A$.

The sine-wave voltage generator sends a current of an intensity $i$ of sinusoidal shape to the capacitor 2 and, assuming $R \gg 1/wC$, where R is the value of the variable resistance 7 and C is that of the capacitor C and $w$ is the pulsation of the sine-wave voltage, it can be assumed that $i = e/R$, $e$ being the instantaneous value of the voltage, i.e. $= e = E \sin wt$. Stated another way the assembly comprising the voltage generator 1 and the resistor 7 can be regarded as an ideal generator of a sine-wave current $i = E/R \sin wt$.

Figure 1A:
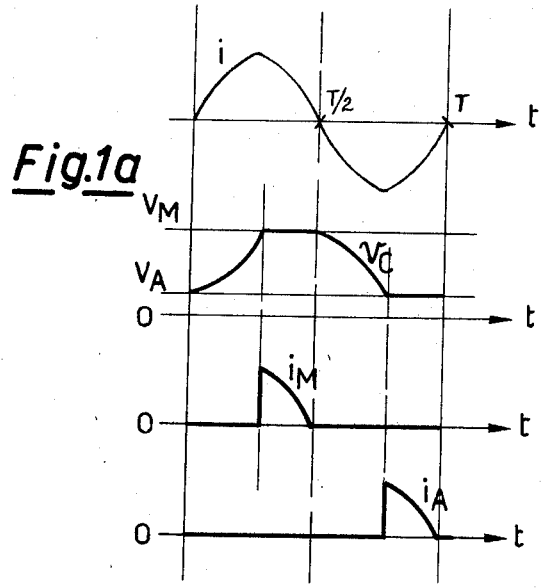
FIG. 1a shows the voltage and current wave forms relevant to the diagram of FIG. 1.

The voltage generator 1 supplies a sinusoidal current $i$ whose waveform is illustrated in the upper graph in FIG. 1a. The DC generator 5 supplies a voltage $V_A$, simulating the intake pressure $P_A$ of the compressor, which initially charges (i.e. at the instant $t=0$) the capacitor 2 to which there is applied a voltage $V_C = V_A$, as indicated at the instant $t=0$ in the second graph of FIG. 1a illustrating the waveform of the tension $V_C$ applied to the capacitor 2.

The DC generator 6 supplies the voltage $V_M$ simulating the delivery pressure $P_M$ of the compressor.

Now, with the increase of the feed voltage and consequently of the current $i$, the capacitor 2 charges, and the voltage $V_C$ across it (see the second graph of FIG. 1a) increases according to the law:

$$V_C = V_A = \frac{1}{C} \int_0^t i\,dt$$

Until such time as the relationship $V_A < v_c < V_M$ is valid, wherein $v_c$ is the voltage at the terminals of the capacitor 2 and $V_A$ and $V_M$ are the values of the positive DC voltages of the generators 5 and 6, respectively, the diodes 3 and 4 are not conductive (closed valves) in that they are inversely polarized and consequently the current $i$ passes entirely through the capacitor 2, while the currents $i_A$ and $i_M$, indicating the currents through the diodes 4 and 3, respectively, which flow in the DC generators 5 and 6, respectively, simulating intake delivery are nil.

When the voltage $v_c$ attains a constant value $V_M$, the voltage at the capacitor 2 does not change and, until the sign of the sine-wave voltage $E \sin wt$ is not changed, the current $i_M$ flows through the diode 3, which is no longer inversely polarized and thus starts to pass a current $i_M$ (see third graph of FIG. 1a) through the generator 6, simulating the cylinder's delivery. At this point, the voltage $V_C$ remains always equal to $V_M$ and cannot exceed this value since all the current $i$ flows now as current $i_M$ through the generator 6 through the diode 3 and no longer passes through the capacitor 2. From this point onwards, the capacitor 2 is discharged and its voltage drops towards $V_A$.

The current $i_M$, simulating the delivery rate of flow, continues to flow through the generator 6 until it is reduced to zero, that is, until the current $i$ is reduced to zero. When the current $i$ changes polarity (from $T/2$ to $T$; first graph of FIG. 1a) the diode 3 can no longer conduct (thus $i_M = 0$) and since $V_C > V_A$ neither can the diode 4 conduct (thus $i_A = 0$). The current $i$ thus passes only through the capacitor 2 and, being negative, reduces the voltage $V_C$ applied across it (see second graph of FIG. 1a) according to the law:

$$V_C = V_M - \frac{1}{C} \int_{T/2}^t i\,dt$$

$T/2$ being the half period of the sinusoidal wave of current $i$.

When the equality $v_c = V_A$ takes place, the diode 4 is no longer inversely polarized and the current $i$ flows now, as current $i_A$, thus simulating intake rate of flow, through the said diode (see fourth graph of FIG. 1a) and the generator 5, until the current $i$ again reaches zero (see first graph of FIG. 1a), while the voltage $V_C$ remains constant and equal to $V_A$. The capacitor 2 thus appears again, after a whole period T of the sinusoidal wave of current $i$, in conditions identical to those corresponding to the time $t=0$, and a fresh cycle commences.

At this stage it is fitting to note that the current pulses $i_M$ and $i_A$ have the same duration and thus cannot directly represent the delivery and the intake of a compressing cylinder, since these have, as is known, different durations.

Figure 3A:
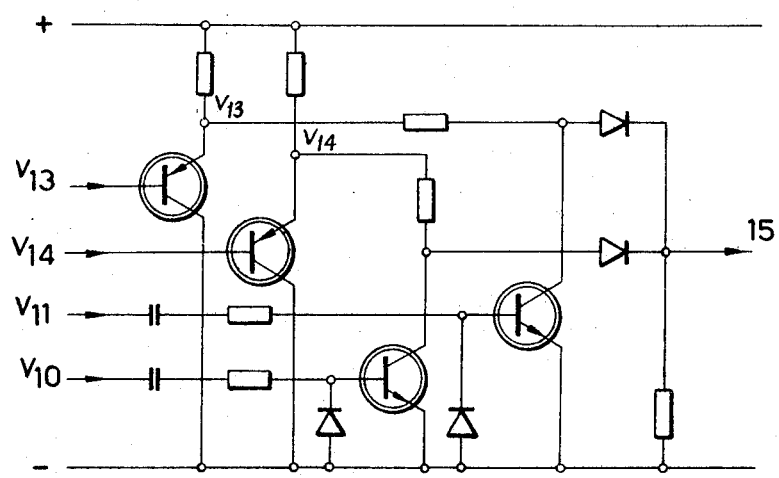
FIG. 3a shows the circuit diagram of the modulator of FIG. 2.
Figure 3B:
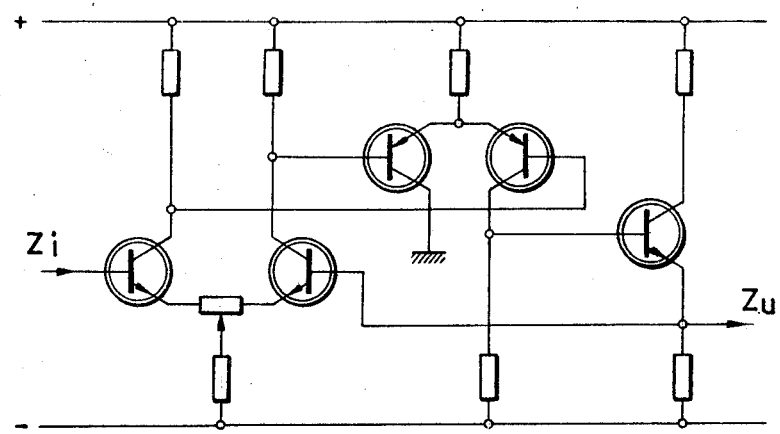
FIG. 3b shows the circuit diagram of the impedance transducers of FIG. 2.

For an accurate simulation of the behaviour of the compressor, resort is then had to coupling two of said circuits, as shown FIG. 2, by two impedance transducers 8 and 9 whose circuitry arrangement is shown FIG. 3b: they have the function of separating the circuits from one another as far as the currents are concerned.

By so doing, the only connection between the simulator circiut for the cylinder intake and that which simulates delivery, is formed by the delivery and intake pressures 6 and 5. It thus becomes possible by separately adjusting the values of the parameters 7'', 2'', 7' and 2', exactly to simulate the delivery and intake pulses of the cylinder.

An original and very expedient feature of the circuit as illustrated is the possibility of using different scales for simulating the delivery and intake rates of flow.

Should the cylinder simulator be an integral part of an installation simulator including artificial lines for simulating the ducts, the possibility of using different scales for the delivery and intake rates of flow is conducive to an extension of the field of application of the simulator, in that it permits the use of artificial lines having similar impedance characteristic for simulating ducts whose acoustical impedances, due to the different conditions of the gases between delivery and intake, are actually different.

FIG. 2 illustrates a circuit made up of the elements 7', 2', 3' and 4' and a similar circuit made up of the elements 7'', 2'', 3'' and 4''. Both the aforesaid circuits are similar to the circuit of FIG. 1. Function in the same way, and are connected in parallel to the steady voltage DC generators 5 and 6. In order to prevent the currents $i_M$ and $i_A$ relative to one of the two circuits from flowing in the other circuit, i.e. to separate the two circuits with respect to the currents, the said circuits are coupled in parallel by means of the two impedance transducers 8 and 9. In this way, although being supplied by the same voltages $V_M$ and $V_A$, the two circuits are autonomous one with respect to the other. This makes it possible, by simply varying the values of the parameters 7', 2' and 7'', 2'', to obtain different values for the currents $i_M$ and $i_A$ relative to the single circuits, i.e. it is possible to use different scales for the simulation of the delivery rate of flow and the intake rate of flow of the compressor.

The aforesaid two circuits are both coupled to the sinusoidal voltage generator 1 by means of a transformer. The said transformer has a centre tap so that at its two extremities 10 and 11 there appear two sinusoidal voltages $v_{10}$ and $v_{11}$ respectively, phase shifted by 180° with respect to one another, whose waveforms are illustrated by the graphs $a$ and $b$ of FIG. 4a. The two circuits are both fed by the voltage $v_{10}$. Each of the two circuits functions as the circuit of FIG. 1 in the manner already described. Across the capacitors 2'' and 2' of the two circuits therefore there will appear respectively two voltages $v_{13}$ and $v_{14}$, the curves of which are illustrated by the graphs $d$ and $e$ of FIG. 4a. The said curves are wholly analogous to that of the voltage $v_0$ of the second graph of FIG. 1a. The difference in the slopes of the curves of the voltages $v_{13}$ and $v_{14}$ is due to the different values produced by the variable parameters 7'', 2'' and 7', 2'.

Bearing in mind the two graphs $d$ and $e$ of FIG. 4a, the functioning of the diagram of FIG. 2 may now be analysed. The voltage $v_{14}$ across the capacitor 2' of the circuit (7', 2', 3', 4'), in view of its greater slope, reaches the value $V_M$ before the voltage $v_{13}$. When $v_{14}$ reaches the value $V_M$, in the manner previously described, the diode 3' is no longer nonconducting and a current $i_M$ could circulate through it. In fact, however, the presence of the impedance transducer 9 prevents the said current $i_M$ from flowing through the generator 6. The current $i_M$, simulating the delivery rate of flow, starts instead to flow through the generator 6 when the voltage $v_{13}$, across the capacitor 2" of the second circuit (7", 2", 3", 4") in turn reaches the value of $V_M$.

The curve of the said current is illustrated in the graph $g$ of the FIG. 4a. The current $i_A$, simulating the intake rate of flow, starts instead to flow through the generator 5 only when the aforesaid voltage $v_{14}$ reaches the value of $V_A$. The current $i_A$ which would flow in the circuit (7", 2", 3", 4") when $v_{13}$ also becomes equal to $V_A$ is instead prevented by the impedance transducer 8. The curve of the current $i_A$ is illustrated in the graph $h$ of FIG. 4a. It can be seen, therefore, that the circuit shown in FIG. 2 may simulate the delivery rate of flow of the compressor by the current $i_M$ flowing in the circuit (7", 2", 3", 4"), and simulate the intake rate of flow of the compressor by the current $i_A$ flowing in the other circuit (7', 2', 3', 4'). This is made possible by the two impedance transducers 8 and 9 which prevent respectively, the flow of the current $i_A$ of the circuit (7", 2", 3", 4") and the flow of the current $i_M$ of the circuit (7', 8', 3', 4'). The layout of the two circuits thereby behaves in a manner analogous to one circuit only, such as that of FIG. 1, across the condenser 2, to which however, there were applied a voltage $v_{15}$, such as that illustrated in the graph $f$ of FIG. 4a, formed respectively, in the first half-period $T/2$ by the wave of weed voltage $v_{10}$, by the wave of voltage $v_{13}$, and in the second half-period (from $T/2$ to $T$) of feed voltage $v_{10}$, and by the wave of voltage $v_{14}$. A like voltage $v_{15}$, in fact, would give, as is also clearly evident from the graphs $f$, $g$, $h$, of FIG. 4a, the current impulses $i_M$ and $i_A$ which are in effect supplied by the circuit of FIG. 2.

As can be seen from the graphs $g$ and $h$ of FIG. 4a, the current impulses $i_M$ obtained with the circuit of FIG. 2 no longer have equal duration as in the case of the circuit of FIG. 1, but indeed the duration of the impulse $i_M$ and the duration of the impulse $i_A$ can be varied, one independently of the other from 0° to 180° by varying respectively the parameters 7", 2" and 7', 2'. Firstly, by varying the parameters 7", 2" there is varied the slope of the curve of the voltage $v_{13}$ (graph $d$ of FIG. 4a) and thus the instant at which the said curve reaches the value $V_M$ with respect to the instant from which the flow of the current $i_M$ commences. Secondly, by varying the parameters 7', 2', there is varied the slope of the curve of voltage $v_{14}$ (graph $e$ of FIG. 4a) and thus the instant at which said curve reaches the value $V_A$ after which the flow of the current $i_A$ commences.

A modulator circuit 28, whose diagram is shown in FIG. 3a, synchronized with the voltage $e=E$ sin wt, makes possible the oscillographic monitoring of the compressor one desires to simulate.

The modulator circuit 28 is arranged to obtain from the two voltages $v_{13}$ and $v_{14}$, respectively, across the capacitors 2" and 2' shown in the circuit of FIG. 2, the equivalent voltage $v_{15}$ which applied to the Y-axis of the oscilloscope makes it possible to see the work cycle of the circuit of FIG. 2, i.e., the cycle $m$ shown in FIG. 4b. The said modulator, the circuit diagram of which is illustrated in FIG. 3a, is made up of two emitter followers, at the bases of which are applied respectively the voltages $v_{13}$ and $v_{14}$, and of two transistors of the NPN type which have applied respectively the voltages $v_{10}$ and $v_{11}$ to their bases. The aforesaid two emitter followers serve to isolate with respect to the currents, the modulator circuit from the circuit shown in FIG. 2. They transmit unaltered their base signals $v_{13}$ and $v_{14}$ which are thus used respectively as feed voltages for the two NPN transistors.

The functioning is as follows: In the first half-period $T/2$ of the voltage waves $v_{10}$ and $v_{11}$ (in this connection the graphs $a$, $b$, $d$, $e$, $f$, of FIG. 4a should also be borne in mind) the voltage $v_{10}$ is positive so that the NPN transistor to the base of which it is applied proves to be saturated. The voltage $v_{14}$ applied across the said transistor then discharges to ground and at the output 15 there will be zero voltage. At the same time, however, (i.e. still in the first half-period $T/2$) the voltage $v_{11}$ is negative, so that the NPN transistor to the base of which is applied the said voltage will prove cutoff. The voltage $v_{13}$ applied across the said transistor is then transmitted to the output 15. As a result, in the first half-period $T/2$ at the output 15 there will appear a voltage having the same curve as the voltage $v_{13}$ in the aforesaid half-period. In the second half-period (from $T/2$ to $T$) of the voltage waves $v_{10}$ and $v_{11}$ the state of the two NPN transistors is inverted. In fact, since the voltage $v_{10}$ is now negative, the NPN transistor to the base of which the said voltage is applied passes from saturated to cutoff and transmits its feed voltage $v_{14}$ to the output 15. Consequently, since the voltage $v_{11}$ is positive, the second NPN transistor to the base of which this is applied, passes from cut-off to saturated and does not transmit voltage $v_{13}$ to the output 15. In the second half-period, then, at the output 15 there will appear a voltage having the same curve as the voltage $v_{14}$ on the aforesaid half-period. As a result, at the output 15 there will appear the voltage $v_{15}$ the curve of which is illustrated in the graph $f$ of FIG. 4a.

FIG. 4b illustrates the work cycles that can be obtained with the circuit of FIG. 2. The said cycles may be seen on the oscilloscope by applying to its X-axis a voltage $v_{12}$ phase shifted by 90° with respect to the feed voltage $v_{10}$ of the circuit of FIG. 2. The said voltage $v_{12}$, whose curve is illustrated by the graph $c$ of FIG. 4a, at the output 12 of the circuit of FIG. 2, is produced by that part of the circuit formed by the resistance 17 in series with the capacitor 18. More specifically the cycle K of FIG. 4b is that which would be seen on the above-mentioned oscilloscope by applying to its Y-axis the voltage $v_{13}$ of the capacitor 2" of the circuit (7", 2", 3", 4"). The cycle 1 is that which would be seen by applying to the Y-axis of the oscilloscope, the voltage $v_{14}$ of the capacitor 2' of the second circuit (7', 2', 3', 4') of the circuit of FIG. 2. As can be clearly seen from FIG. 4b each of the aforesaid two identical circuits of which the circuit of FIG. 2 is composed, produce horizontal sections of equal length, which if the circuit is to be able to simulate respectively the intake phase (section indicated with $V_A$ in the cycles $k$ and $l$ of FIG. 4b) and the delivery phase (section indicated with $V_M$ in FIG. 4b) of a compressor should have different lengths. The cycle $m$ of FIG. 4b, finally, is that which is seen on the oscilloscope by applying to its Y-axis a voltage $v_{15}$ which, as already stated, is that which should be applied across the capacitor of a circuit such as that of FIG. 1 so that this may function in the same way as in the diagram of FIG. 2.

The aforementioned cycle $m$ is thus the effective work cycle produced by the diagram of FIG. 2, and since there is now an intake phase (indicated with $V_A$) different from the delivery phase (indicated with $V_M$), the possibility of simulating the work cycle of any reciprocating compressor is realised.

Figure 5:
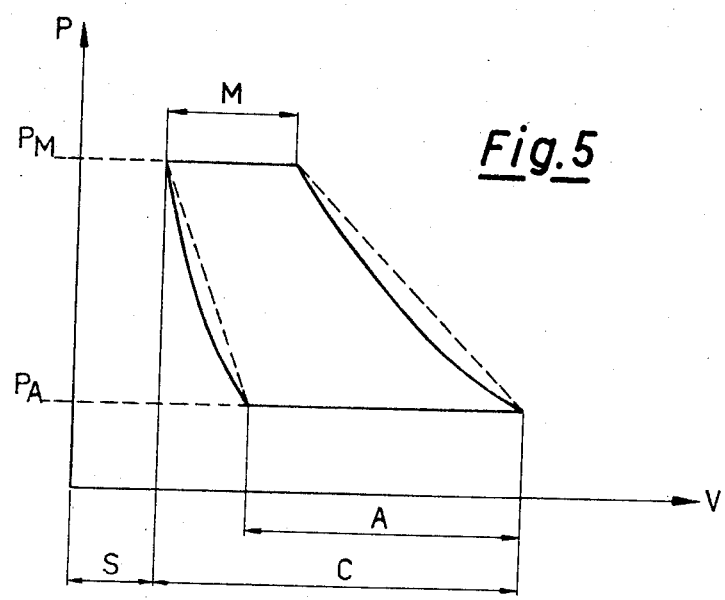
FIG. 5 shows the working cycle of the compressor to be simulated.

FIG. 5 illustrates the usual effective work cycle of the cylinder of a compressor. $P_A$ and $P_M$ indicate respectively the intake and delivery pressures and S the dead space, that is to say, the part of the active volume of the cylinder that is not within the stroke of the piston. By active volume of a single-acting cylinder, or compression chamber, there is indicated the part of volume of the cylinder limited by the stroke of the piston. Considering the cycle in an anti-clockwise direction starting from the point of coordinates $[(S+C-A), P_A]$, there is the intake phase (A), the adiabatic pressure from $P_A$ to $P_M$, the delivery phase (M) and finally the adiabatic expansion phase of the fluid left in the dead space S.

It is not necessary, in fact, to accurately represent the polytropic or adiabatic curves of compression from the volume $(S+C)$ to the volume $(S+M)$ and of expansion from the volume $(S+C-A)$, see FIG. 5, in that, during said transformations, the valves are closed and thus the duct system is not stressed. Only in the case of very significant pressural oscillations with respect to the mean values $P_M$ and $P_A$, $P_M$ and $P_A$ being the mean delivery pressure and the mean intake pressure, respectively, a more realistic display would be needed. In such cases, however, the display would be redundant in that it would be certainly necessary to modify the duct system so as to overcome said oscillations.

Therefore, the true cycle of the cylinder of the compressor can be simplified by substituting the adiabatic curves of compression and of expansion with two straight line segments (dashed line in FIG. 5). With this simplification the real cycle of the cylinder takes on the form of a trapezoid, a form perfectly analogous to the work cycle (graph $m$ of FIG. 4b) embodied by the diagram of FIG. 2. It follows from this that the diagram of FIG. 2 is able to simulate the work cycle of the cylinder of any reciprocating compressor.

In order to reduce the oscillations of pressure in the piping conected to a single-acting cylinders use is often made of the inactive volume of the cylinders as compensation chamber of the said oscillations. The inactive volume of a single-acting cylinder is that part behind the piston which does not contain fluid to be compressed. In other words, the said reduction is achieved by connecting, by means of a duct, the inactive volume of the cylinder of the compressor to the intake duct. The said inactive volume, similarly to the active volume already defined, varies sinusoidally following the displacement of the piston but phase-shifted 90° with respect to the sinusoidal variation in the active volume. In other words, the laws with which the active volume and the inactive volume of the cylinder vary are both sinusoidal but phase-shifted by 90° between them as can be clearly understood from the fact that, when the active volume is zero, the inactive volume is maximum; when the active volume is maximum, the inactive volume is zero. During the intake phase, then, one part of the flow of the fluid, the extent of which depends on the section of the duct connecting the inactive volume to the intake duct, passes into the active volume through the connecting duct from the inactive volume, and during the compression phase, further fluid is drawn into the inactive volume, thereby reducing pressure fluctuations in the intake duct.

This flow into the inactive volume of the cylinder undergoes, through the effect of the reciprocating displacement of the piston, a to-and-fro movement from the intake duct to the inactive volume of the cylinder and vice versa which is governed by the same law with which the said inactive volume of the cylinder varies.

The aforesaid part of rate of flow thus varies sinusoidally phase-shifted by 90.° with respect to the feed flow. To be able to simulate the effect of this part of rate of flow, on the basis of the analogy adopted whereby the mass rates of flow correspond to the currents, it is then necessary to have available a sinusoidal current of amplitude depending on the extent of the part of the flow conveyed into the inactive volume of the cylinder, and phase-shifted by 90° with respect to the feed current of the circuit simulating the said cylinder. This is achieved in the circuit of FIG. 2 by means of the switch 19 which in fact makes available at the output 16 a sinusoidal current the amplitude of which can be regulated by varying the parameters 7' and 2', and which, through the effect of the network formed by the resistor 7' in series with the capacitor 2', in phase-shifted by 90° with respect to the feed voltage $v_{10}$ of the circuit and thus with respect to the feed curent which is in phase with the said voltage.

In a double-acting cylinder where there is a common intake for both parts of the cylinder, the effect of a reduction of the flow to 50% of its maximum value is achieved by means of a valve-raising device which, by keeping the intake valve in one half of the cylinder open, causes the flow to behave in a manner similar to that in a single-acting cylinder utilising the inactive volume. As in that case the part of flow conveyed into the part of the cylinder with the permanently open intake valve undergoes, through the effect of the reciprocating displacement of the piston 12, a to-and-fro movement through the said valve governed by the same law with which the volume of that part of the cylinder varies, i.e. it varies sinusoidally phase-shifted by 90° with respect to the feed flow. Again, as was stated in the previous case, there is the possibility of simulating in the circuit of FIG. 2 the effect of the aforesaid part of flow by means of the switch 19 which, when shifted from its upper position (shown) to its lower position, makes available at the output 16 a sinusoidal current phase-shifted 90° with respect to the feed current and the amplitude of which can be regulated to 50% of the maximum amplitude of the said feed current by regulating the parameters 7' and 2'.

It is also possible correctly to simulate the rate of flow adjustment by the variation of the clearance volume of the compressor cylinder by varying the capacitors 2' and 2" while leaving the values of 7' and 7" unaltered.

For the simulation, then, of the second action of the double-acting cylinder, the voltage at the point 11 of FIG. 2 is utilized, but with a phase which is reversed with respect to that of the point 10, by means of a transformer's effect in a circuit which is the full counterpart of the one used for the first effect.

The functioning of a double-acting cylinder is similar to that of two distinct single-acting cylinders operating with a phase-shift between them of 180°.

From what has been said, and given that the diagram of FIG. 2 is capable of simulating the functioning of only one single-acting cylinder, it follows that it is necessary to provide two circuits similar to that of FIG. 2 to simulate the functioning of the two single-acting cylinders analogous to the double-acting cylinder. And then, since the two single-acting cylinders have to operate with phase-shift between them of 180°, the two circuits, each similar to the circuit of FIG. 2 and each simulating one of the aforesaid cylinders have to be fed by sinusoidal voltages with a phase-shift between them of 180°. Consequently, the simulation of a double-acting cylinder is achieved with two circuits similar to that of FIG. 2, each of which simulates an effect of one-half the double-acting cylinder, which circuits are fed respectively with the voltages $v_{10}$ and $v_{11}$, which as previously stated, are out-of-phase by 180°.

With such a circuit as shown in FIG. 2, the simulation of a compressing cylinder the geometrical characteristics of which are known (piston displacement and clearance) as well as the means operative pressures ($P_M$ and $P_A$), is unusually simple and ready.

As a matter of fact, once the exponent N of the compression and expansion law is known:

$$PV^N = \text{constant}$$

the delivery and intake volumes M and A are easily determined and thus the mass rate of flow which, on the basis of the selected scales, determinates the means values $\bar{I}_M$ and $\bar{I}_A$ should represent the average rates of flow of a by segments of two sinusoids whose mean square values $I_M$ and $I_A$ are determined by the expressions:

$$I_M = 2.22 \frac{C}{M} \bar{I}_M \tag{1}$$

$$I_A = 2.22 \frac{C}{A} \bar{I}_A$$

Obviously, in the case of double-acting cylinders, $\bar{I}_M$ and $\bar{I}_A$ should represent the average rates of flow of a single action. The expressions (1) permit to calibrate 7″ and 7′ directly in terms of values of current, $I_M$ and $I_A$, respectively.

Upon watching then on the oscillograph the working cycle of the cylinder as it appears on FIG. 4b, it is possible to vary the values of 2″ and 2′ until the desired ratios C to M and C to A are obtained. A means-value instrument inserted in series at the output 6 and at the input 5 of FIG. 2, allows moreover the checking of the exact value of $\bar{I}_M$ and $\bar{I}_A$.

The circuit of FIG. 2 makes it possible to simulate the functioning of only one compressor cylinder. It is thus evident that to simulate the functioning of several compressor cylinders there are required as many circuits like that shown in FIG. 2 as are the cylinders to be simulated.

On the other hand, several cylinders coupled mechanically to one and the same crankshaft are characterized by the fact that they function phase-shifted between them a certain angle. This, as a result of what has been said will require a number of circuits similar to that of FIG. 2, each simulating a cylinder and each fed by sinusoidal voltages phase-shifted between them by the same angle with which the work cycles of the various compressor cylinders to be simulated are phase-shifted.

What is claimed is:

1. An electronic simulator of gas pressure and flow in a cylinder containing a reciprocating piston, in which voltages are employed to simulate gas pressure and currents are used to simulate gas flow, comprising two similar, coupled circuits provided with a common higher, and a common lower, potential source, each source having first and second terminals, the potentials of said sources simulating, respectively the discharge and intake pressure at the cylinder, each circuit having first and second rectifiers connected in series between the first terminals of said sources, thereby limiting current flow to the flow from the lower to the higher potential source, and thereby simulating the intake and delivery valves, respectively, of the compressor, a variable resistor in each circuit, a variable capacitor in each circuit connected across a point between the two rectifiers and simulating the cylinder volume, an alternating current source connected, in series with the variable resistor in each circuit, across the capacitors to simulate the movement of the piston in the cylinder, one circuit including an impedance transducer connected between the higher potential current source and the rectifier which is connected to said higher potential source, and the other circuit including an impedance transducer connected between the lower potential source and the rectifier which is connected to said lower potential source said two circuits being connected in parallel to the two impedances, in order that current will flow from the lower potential source into the capacitor in said second circuit only when current flows into the capacitor in said first circuit, and current will flow into the higher potential source from said first circuit only when current is flowing into said higher potential source from said second circuit, electrically-operable display means, and a synchronous modulator connected to said alternating current source and to both circuits, and to said display means, to supply signals to said display means from said second circuit during a first half cycle and from said first circuit during a second half cycle of said alternating current source.

2. An electronic simulator as claimed in claim 1, including a sinusoidal voltage generator, and wherein the two circuits are coupled through a transformer to said sinusoidal voltage generator, said transformer is connected by a center tap to the two circuits, and said resistors and capacitors are adjustable to vary the characteristics of the two circuits to simulate different rates of flow of gas into and out of the cylinder.

3. An electronic simulator as claimed in claim 1, having a non-variable capacitor and a non-variable resistor connected in series to one another and in parallel with the two variable capacitors.

References Cited

UNITED STATES PATENTS

| | | | |
|---|---|---|---|
| 2,771,243 | 11/1956 | Wolin et al. | 235—184 |
| 2,829,826 | 4/1958 | Wolin et al. | 235—184 |

MALCOLM A. MORRISON, Primary Examiner

F. D. GRUBER, Assistant Examiner

U.S. Cl. X.R.

235—197; 307—229; 328—132